United States Patent [19]

Miyamoto

[11] Patent Number: 5,293,106
[45] Date of Patent: Mar. 8, 1994

[54] PROGRAM REVIEWING DEVICE IN NUMERICAL CONTROL PROCESSING APPARATUS

[75] Inventor: Takami Miyamoto, Gifu, Japan

[73] Assignee: Murata Kikai Kabushiki Kaisha, Kyoto, Japan

[21] Appl. No.: 932,734

[22] Filed: Aug. 25, 1992

Related U.S. Application Data

[63] Continuation of Ser. No. 622,438, Dec. 5, 1990, abandoned.

[30] Foreign Application Priority Data

Dec. 11, 1989 [JP] Japan .................................. 1-322176

[51] Int. Cl.⁵ ............................................. B21D 28/00
[52] U.S. Cl. .................................. 318/568.1; 318/563; 318/569; 364/188; 364/474.24; 364/474.25
[58] Field of Search .................... 318/560–640; 364/474.01–474.33, 188, 191, 192

[56] References Cited

U.S. PATENT DOCUMENTS

| | | | |
|---|---|---|---|
| 4,513,366 | 4/1985 | Munekata et al. | 318/563 |
| 4,530,046 | 7/1985 | Munekata et al. | 318/568 X |
| 4,607,327 | 8/1986 | Kishi et al. | 318/569 |
| 4,628,444 | 12/1986 | Nozawa et al. | 364/188 |
| 4,633,409 | 12/1986 | Sekikawa | 318/568 |
| 4,700,313 | 10/1987 | Takagawa | 318/568 X |
| 4,788,481 | 11/1988 | Niwa | 318/600 |
| 4,794,514 | 12/1988 | Hideaki et al. | 364/474.22 |
| 4,922,440 | 5/1990 | Kawamura et al. | 364/474.22 |
| 4,926,311 | 5/1990 | Matsumura et al. | 364/191 |
| 4,939,635 | 7/1990 | Seki et al. | 361/191 |
| 4,949,270 | 8/1990 | Shima et al. | 364/474.26 |
| 4,956,787 | 9/1990 | Ito et al. | 364/474.24 |
| 4,967,189 | 10/1990 | Sumita et al. | 364/474.16 X |
| 5,006,977 | 4/1991 | Seki et al. | 364/474.26 X |
| 5,021,966 | 6/1991 | Seki et al. | 364/474.26 |
| 5,067,087 | 11/1991 | Seki et al. | 364/474.24 |
| 5,072,398 | 12/1991 | Seki et al. | 364/674.25 |

*Primary Examiner*—Paul Ip
*Attorney, Agent, or Firm*—Spensley Horn Jubas & Lubitz

[57] ABSTRACT

A program reviewing device in a numerical control processing apparatus such as a punch press machine for effecting processing in accordance with an NC program. The device includes a display unit; a shape display control unit for displaying a work shape obtained in accordance with an NC program on the display unit; an indication element for indicating a reviewing portion in the display unit on which the work shape is displayed; and a step display control unit for displaying a step of the NC program corresponding to the portion indicated by the indication element on the display unit.

2 Claims, 4 Drawing Sheets

PROGRAM REVIEWING DEVICE IN NUMERICAL CONTROL PROCESSING APPARATUS

This is a continuation of application Ser. No. 07/622,438 filed on Dec. 5, 1990, now abandoned.

FIELD OF THE INVENTION

The present invention relates to a program reviewing device, and more particularly to a program reviewing device in a numerical control processing apparatus for effecting processing in accordance with a NC program.

RELATED ART STATEMENT

As a conventional numerical control processing apparatus (for example, a NC punch press machine) for effecting processing in accordance with a NC program, an apparatus has been known which has a function in which the NC program is temporarily executed on a CRT and the state of processing according to the NC program is reviewed. However, in the conventional apparatus, in the case where judgement is made that the NC program contains an inadequate portion, it is necessary that steps of the NC program are displayed on the CRT and an operator searches an inadequate step while reading these steps. Therefore, it is difficult for the conventional numerical control processing apparatus to search the inadequate portion of the NC program.

On the other hand, there has been known a numerical control processing apparatus on which an automatic programming device is mounted. In this case, a processing program is once prepared using languages peculiar to the automatic programming device, and the thus prepared proper processing program is converted into a NC program. The numerical control processing apparatus executes processing in accordance with the obtained NC program. However, in the conventional structure, languages are not unified between the automatic programming apparatuses. Therefore, with respect to programs prepared by other automatic programming apparatus, it becomes necessary to search inadequate portions by cumbersome work similarly to the aforementioned conventional apparatus. Furthermore, in the conventional structure, a particular automatic programming apparatus is required, resulting in higher cost.

OBJECT AND SUMMARY OF THE INVENTION

It is an object of the present invention to provide a program reviewing device in a numerical control processing apparatus which requires no special automatic programming device and which can easily find an inadequate step of NC program.

The program reviewing device according to the present invention is the program reviewing device in a numerical control processing apparatus for effecting processing in accordance with a NC program. This device comprises a display means; a shape display control means for displaying a work shape obtained in accordance with a NC program on said display means; an indication means for indicating a reviewing portion in said display means on which the work shape is displayed; and a step display control means for displaying a step of the NC program corresponding to the portion indicated by said indication means on said display means.

In the program reviewing device according to the present invention, in carrying out the program reviewing, the shape display control means displays the work shape obtained in accordance with the NC program on the display means. The operator uses the indication means to indicate a reviewing portion while seeing the displayed shape. Next, the step display control means displays on the display means the step of the NC program corresponding to the portion indicated by the indication means. Thereby, the operator can easily recognize which is the step of the NC program corresponding to the reviewing portion in the work shape.

In this case, the step of the NC program itself is an object to be processed, and therefore, an automatic programming apparatus which is actuated by special language is not required.

DETAILED DESCRIPTION OF PREFERRED EMBODIMENT

Figure 1:
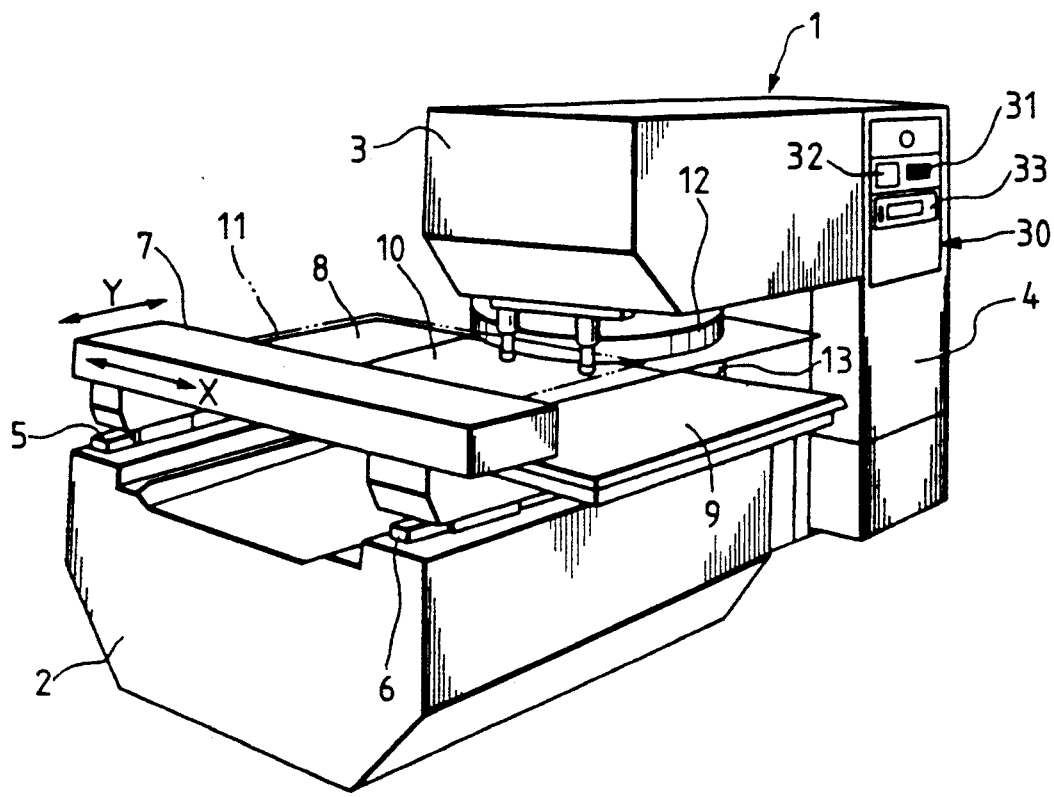
FIG. 1 is a schematic perspective view of a punch machine in which one embodiment of the present invention is employed.

FIG. 1 shows a punch press machine (one example of a numerical control processing apparatus) to which one embodiment of the present invention is employed.

In FIG. 1, a punch press machine 1 is principally composed of a lower frame 2, an upper frame 3 arranged above the lower frame 2 and a throat portion 2 supporting them at the rear thereof. A fixed table 10 is arranged in the central portion on the upper surface of the lower frame 2. On both sides of the fixed table 10, a pair of guide rails 5 and 6 are arranged on the upper surface of the lower frame 2. A carriage 7 extending in a lateral direction (in a direction of axis X) is provided movably depthwise (in a direction of axis Y) on the guide rails 5 and 6. On both sides of the fixed table 10, a pair of movable tables 8 and 9 secured to the carriage 7 are arranged. On the carriage 7, a cross slide (not shown) on which a work holder for holding a plate 11 (work) is attached is provided movably in a direction of axis X. A substantially disk-like upper turret 12 on which a plurality of punches are mounted is rotatably mounted on the upper frame 3. Below the upper turret 2, a substantially disk-like lower turret 13 coaxial with the upper turret 12 is arranged on the lower frame 2. A number of dies corresponding to the punches provided on the upper turret 12 are secured to the lower turret 13.

A control panel 30 is arranged on the side of the throat 4. The control panel 30 is provided with a keyboard 31 for key inputs by an operator, a display CRT 32, an IC card reader 33 for collectively inputting NC programs and the like. The keyboard 31 includes a processing start key, a program check-start key, a cursor key, a no-check key, a designation termination key, character keys including alphabets and figures, and so on.

Figure 2:
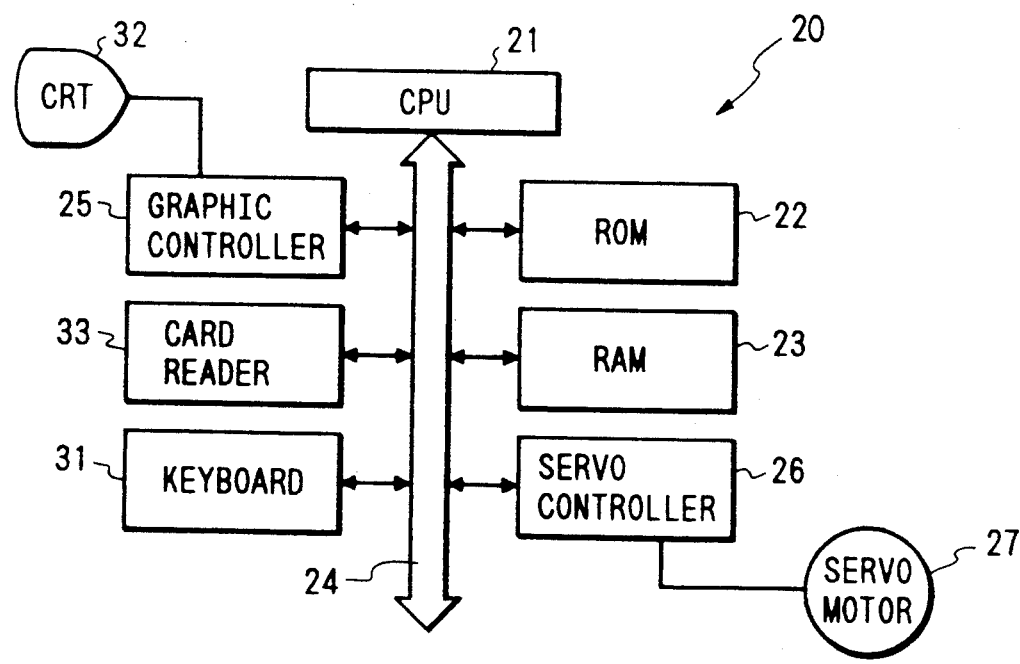
FIG. 2 is a schematic block diagram of a control section.

The punch press machine 1 has a control section 20 shown in FIG. 2. The control section 20 is provided with a microcomputer including CPU 21, ROM 22, RAM 23, and the like. CRT 32 through a graphic controller 25, a card reader 33 and a keyboard 31 are connected to a data bus 24 of the control section 20. A group of servo motors 27 for driving the carriage 7, turrets 12, 13 and the like are connected to the data bus 24 through a servo controller 26. The control section 20 has a control function including a program reviewing function which will be described below.

Figure 3A:
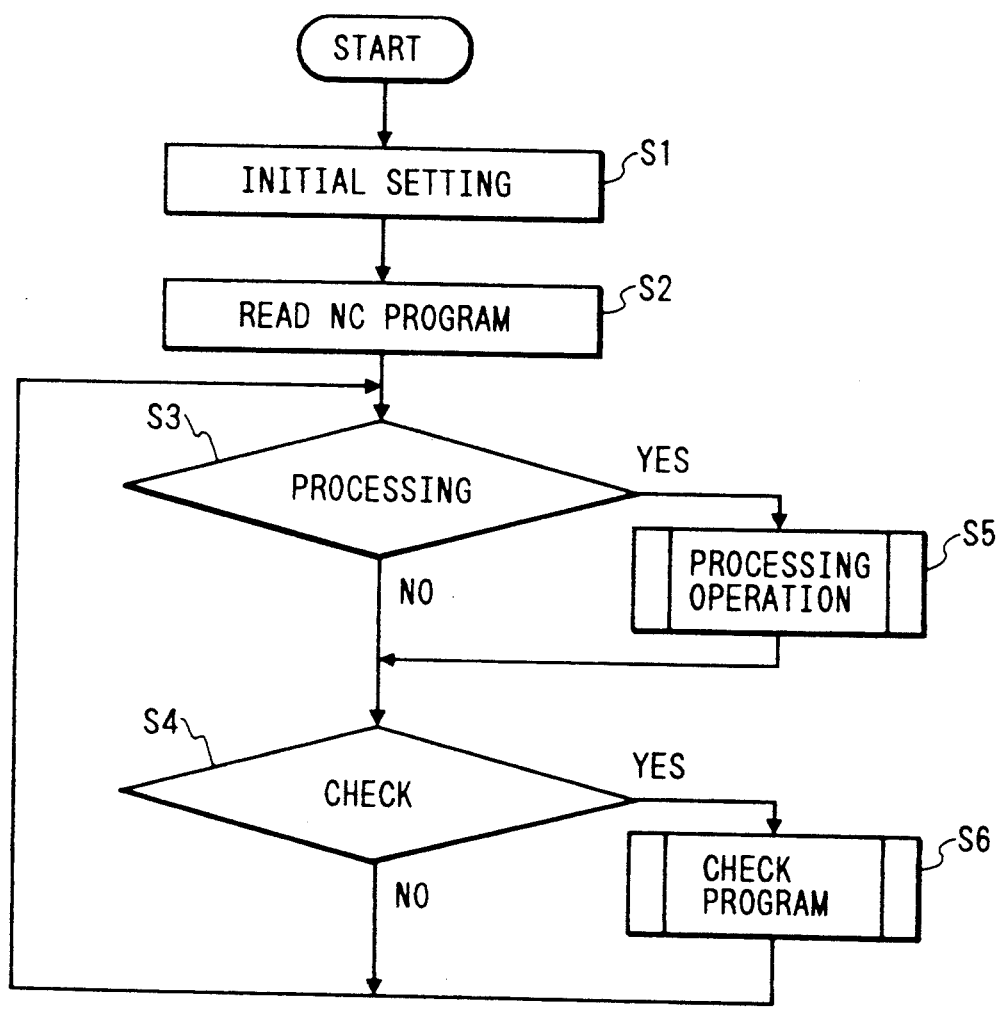
FIGS. 3a and 3b are respectively control flow charts.

The operation of the aforementioned embodiment will be described hereinafter in accordance with a control flow chart shown in FIGS. 3a and 3b.

When the program starts, in Step S1, initial setting is carried out in which the movable tables 8 and 9, turrets 12 and 13, etc. are set to their original position, and data of the plate 11 to be supplied are inputted. In Step 2, the card reader 33 is used to read the NC program.

Next, in Step S3, judgement is made if the processing start key on the keyboard 31 is depressed. If the processing start key is not depressed, the step moves to Step S4. In Step S4, judgement is made if the program check start key is depressed. If this key is not depressed, the step is again returned to Step S3.

When the processing start key is depressed, the program moves from Step S3 to Step S5. In Step S5, the carriage 7, movable tables 8 and 9, turrets 12 and 13, etc. are controlled in accordance with the NC program read to thereby process the work 11 supplied in a predetermined manner (detail of which is omitted). When all processing operations indicated by the NC program have been terminated, the control is returned to a main routine.

Figure 3B:
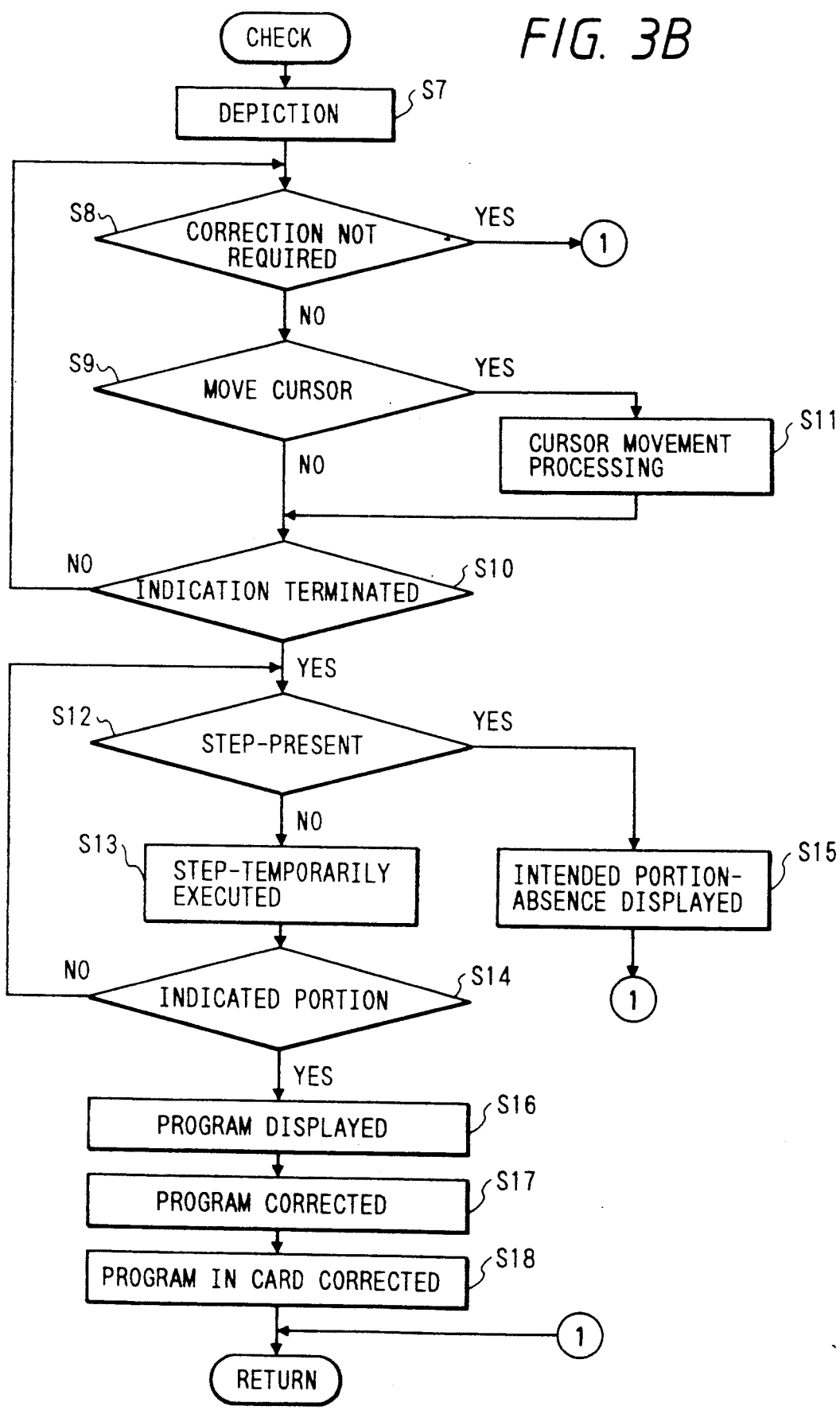
Figure 4A:
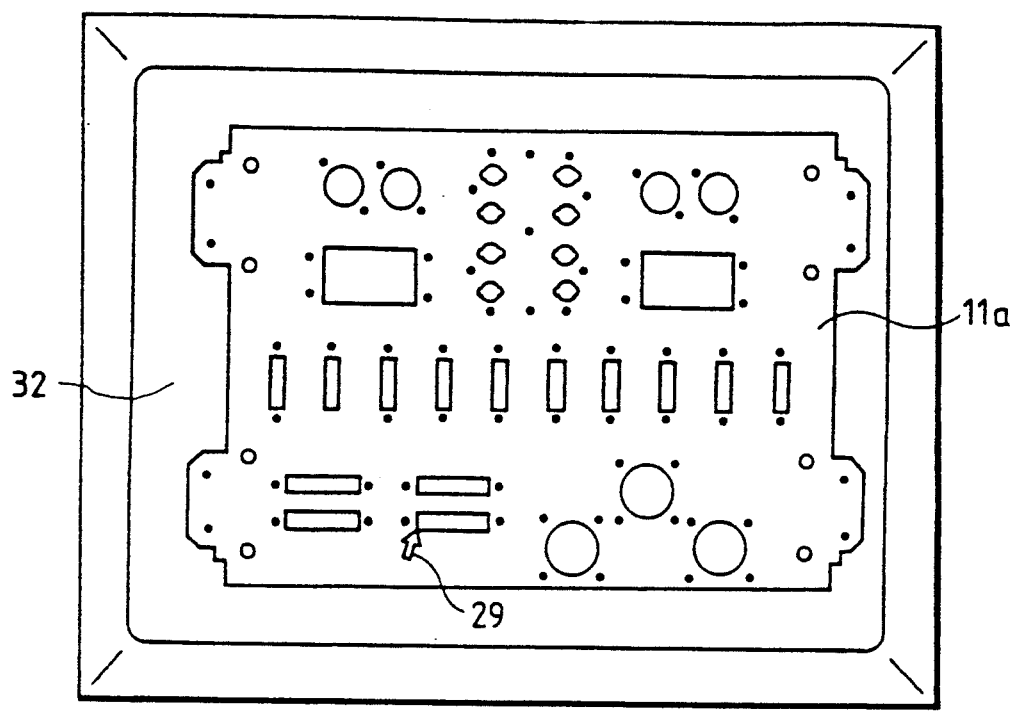
FIGS. 4a and 4b are respectively front views showing the display state of CRT.

When the program check start key is depressed for review and correction of the NC program, the program moves from Step S4 to Step S6, and a program check subroutine shown in FIG. 3b is executed. In Step S7 shown in FIG. 3b, a shape of the plate after processed which is formed after the processing in accordance with the plate data inputted in Step S1 and the NC program inputted in Step S2 is depicted on the CRT 32. Here, the tables 8 and 9, turrets 12 and 13, etc. are not actually operated but processing in accordance with the NC program is carried out merely on the image plane of the CRT 32. In FIG. 4a showing one example, to the plate 11a after processed displayed on the CRT 32 are added shapes such as a rectangle, a circle, etc. in accordance with the NC program.

In Step S8, judgement is made if the no-check key which means that correction is not required is depressed. In Step S9, judgement is made if the cursor key is depressed. Further, in Step S10, judgement is made if designation by the cursor is terminated. Here, processings of Steps S8 to S10 are repeated so that the program waits for depression of either key.

If the operator who checked the image on the CRT 32 has judged that the processing state is good, the no-check key is depressed. Thereby, the program returns from Step S8 to the main routine shown in FIG. 3a. On the other hand, in the case where the operator found an inadequate processed portion, the cursor 29 (FIG. 4a) is moved to that portion. For this movement, the cursor key is used. If the cursor key is depressed, the program moves from Step S9 to Step S11, where the cursor movement processing is carried out. Thereby, the cursor 29 is moved on the CRT 32. If the cursor key 29 can be set to the desired position, the operator depresses the designation termination key. Thereby, the program moves from Step 10 to Step 12.

In Step 12, judgement is made if among the NC program the step to be read next is present. Since in the beginning, the step to be read is present, the step moves to Step S13. In Step S13, the first step of the NC program is temporarily executed in CPU 21 irrespective of the image displayed on the CRT 32 and the actual operation. In Step S14, judgement is made if the operated portion of the temporarily executed step is coincided with the portion designated by the cursor 29. If the judgement shows No, the step is returned to Step S12, where thereafter processings are repeated. If the step corresponding to the designated portion by the cursor 29 is not found even after all steps have been executed, the program moves from Step S12 to Step S15. In Step S15, the CRT 32 displays to the effect that the intended step is not present, and the step is returned to the main routine in FIG. 3A.

Figure 4B:
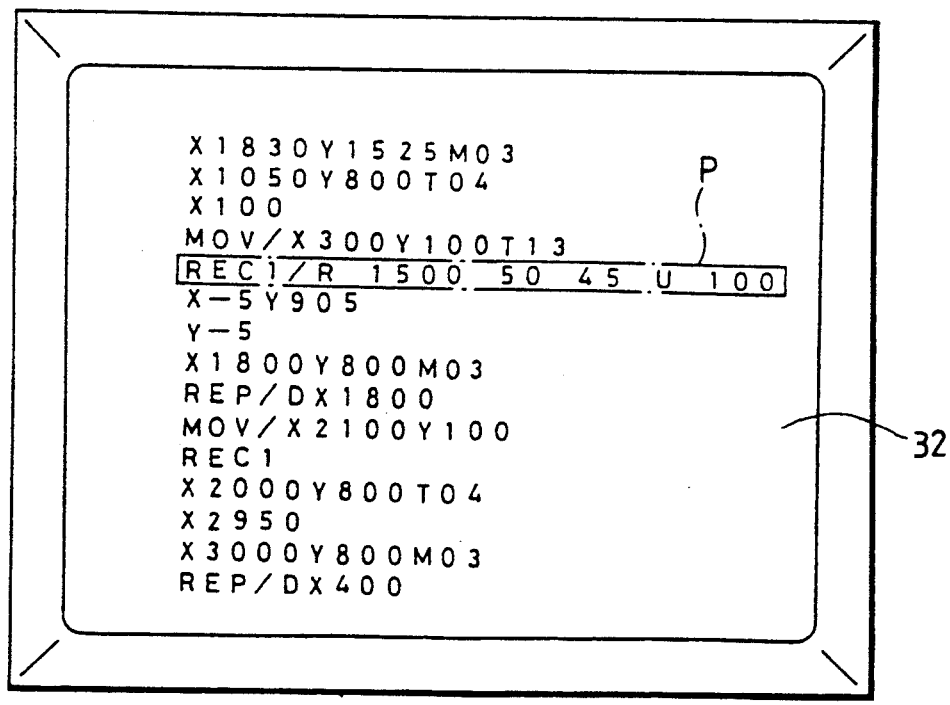

In the case where as the result of processing in Step S13, the step corresponding to the designated portion by the cursor 29 is found, the program moves from Step S14 to Step S16. In Step S16, a partial NC program including the corresponding display of NC program is displayed on the CRT 32. One example at that time is shown in FIG. 4B. With respect to the step (the step shown at one-dot chain line P in FIG. 4b) corresponding to the portion designated by the cursor 29, a display flickers. Thereby, the operator can easily judge which is the step of the program to be corrected. In Step S17, character keys (alphabet keys and figure keys, etc.) on the keyboard 31 are used to correct the program. With this correction, the content of the program display on the CRT 32 is changed. If the correction of the program in Step S17 is terminated, the step moves to Step S18. In Step S18, IC cards received in the card reader 33 are also corrected in NC program. If the processing in Step S18 is terminated, the step is returned to the main routine shown in FIG. 3A.

In this manner, in this embodiment, it is possible to easily correct the NC program without provision of an automatic programming device in which ununified and special language is used.

Other embodiments will be described hereinafter.

(a) The NC program in Step S2 is not limited to be read into the IC card but into perforated tapes, for example. In case of using the perforated tape, after confirmation of an inadequate step on the CRT 32, a separate perforated tape preparation apparatus may be used to correct the NC program on the perforated tape.

(b) While in the aforementioned embodiment, an inadequate step has been merely displayed on the CRT, it is to be noted that an explanation of meaning (instructed content) of the inadequate step may be simultaneously displayed.

(c) In the aforementioned embodiment, after an inadequate processed portion has been first pointed out by the cursor, the step corresponding thereto is searched out of the NC program. However, the present invention is not limited thereto. Alternatively, in the depiction in Step S7, the relationship between the steps of the NC program and coordinates on the plate 11a are all stored in RAM 23 so that judgement may be made in accordance with the stored information as to which is the step corresponding to the pointed out processed portion. In this case, steps S12 to S14 are not necessary.

(d) The present invention may be applied not only to the turret punch press machine but also other processing apparatuses such as a machining center. In the case where a change in time of work comprises an important element in processing, the depiction in Step S7 may comprise a display which changes with time. In this case, the operator recognizes images which continuously change depicted on the CRT 32, and when an inadequate portion is displayed thereon, the operator depresses the designation termination key. The step executed in the key input timing may be judged to be inadequate, and therefore, the step in the NC program corresponding to the inadequate processing state is found by the control section 20. In this case, designation by the cursor 29 or the like is not required.

The program reviewing device according to the present invention is provided with the shape display control means, the indication means and the step display control means as mentioned above. Accordingly, the step in the NC program corresponding to the inadequate processing can be easily found out without provision of the automatic programming apparatus which uses special language.

What is claimed is:

1. A device for reviewing a NC program in a numerical control processing apparatus comprising:

a display;

shape display control means for displaying a representation of a work piece, which would be obtained in accordance with the NC program, on the display;

indicator means for indicating a reviewing portion of the work piece representation displayed on the display;

identifying means for identifying a step of the NC program which corresponds to the indicated reviewing portion; and step display control means for displaying the step of the NC program which corresponds to the indicated reviewing portion.

2. A program reviewing device as claimed in claim 1, wherein the numerical control processing apparatus comprises a punch press machine including a control section, the control section being provided with a microcomputer including a CPU, ROM and RAM, and wherein a data bus of the control section is operably connected to the display through a graphic controller, a card reader, a keyboard and at least one servo motor through a servo controller.

* * * * *